June 5, 1934.    B. J. UKROPINA    1,961,262
CONCRETE PIPE JOINT
Filed May 2, 1933
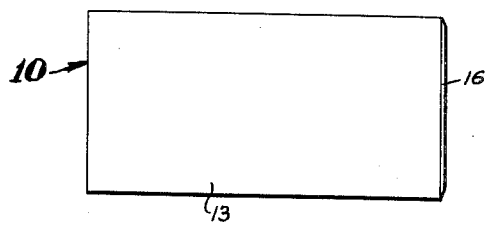
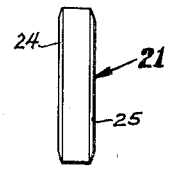
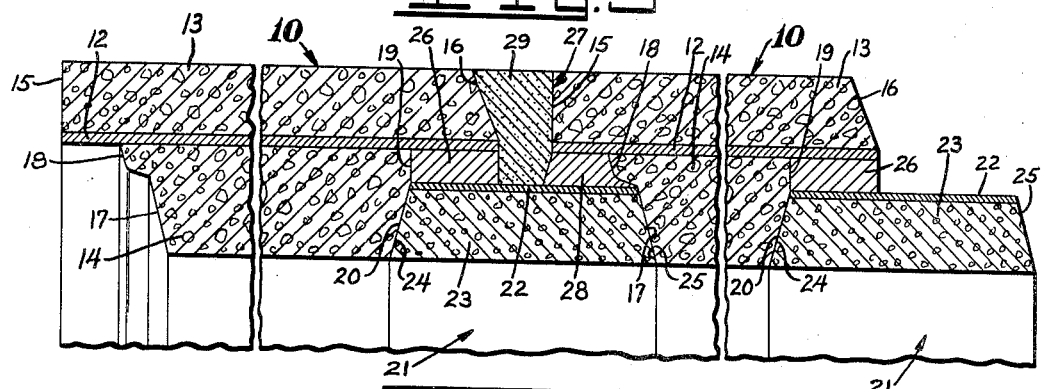
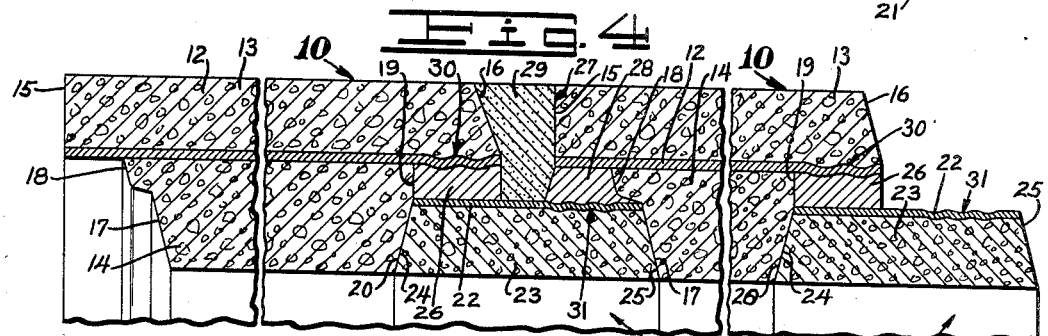
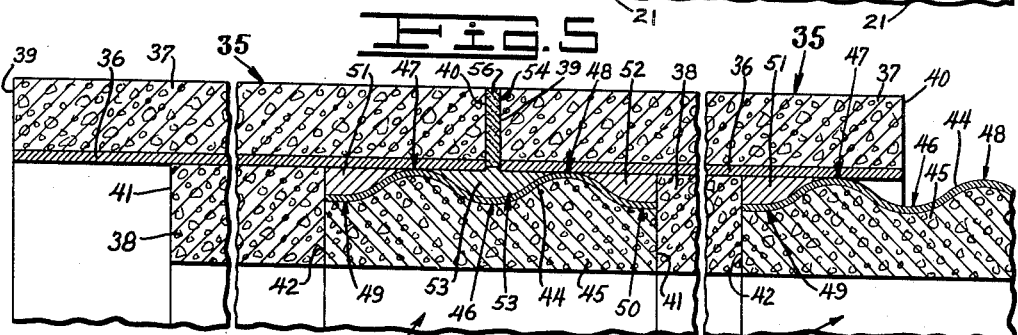
INVENTOR.
B. J. UKROPINA.
BY
ATTORNEY.

Patented June 5, 1934

1,961,262

UNITED STATES PATENT OFFICE 1,961,262

CONCRETE PIPE JOINT

Bozidar J. Ukropina, Los Angeles, Calif.

Application May 2, 1933, Serial No. 668,971

5 Claims. (Cl. 72—53)

This invention relates to improvements in concrete pipes and concrete pipe joints.

The general object of this invention is to provide a novel concrete pipe joint.

Another object of the invention is to provide a novel concrete pipe construction.

Other objects and the advantages of this invention will be apparent from the following description taken in connection with the accompanying drawing wherein:

Fig. 1 is a side elevation of a length of concrete pipe embodying the features of my invention;

Fig. 2 is a side elevation of a collar member used in forming my improved pipe joint;

Fig. 3 is a fragmentary longitudinal section through two connected lengths showing my improved pipe and joint construction;

Fig. 4 is a view similar to Fig. 3 showing a slightly modified joint construction, and;

Fig. 5 is a view similar to Fig. 3 showing a further modified form of pipe and pipe joint construction.

Referring to the drawing by reference characters I have indicated a length of concrete pipe embodying the features of my invention generally at 10. As shown the pipe 10 comprises a metal reinforcing tube 12 embedded between an outer layer of concrete 13 and an inner layer of concrete 14.

The outer layer of concrete 13 at one end terminates flush with the adjacent end of the reinforcing tube 12 as indicated at 15 and at the opposite end also terminates flush with the adjacent end of the reinforcing tube and is beveled as indicated at 16. The end of the inner layer of concrete 14 adjacent the end 15 of the outer layer is set back from the adjacent end of the reinforcing tube 12 and is beveled centerward as indicated at 17. Adjacent the reinforcing tube the end 17 includes a protruding flange portion 18. The end of the inner layer of concrete 14 opposite the end 17 is likewise set back from the adjacent end of the reinforcing tube 12 and includes a plane face 19 adjacent the tube and an inwardly beveled face 20.

In forming my improved joint between two lengths of pipe 10 I use a collar member which is indicated generally at 21 and is shown in detail in Fig. 2. As shown the collar 21 comprises a metal band 22 having a concrete ring 23 cast therein. The opposed faces of the collar 21 are preferably beveled as indicated at 24 and 25. The outside diameter of the collar 21 is less than the inside diameter of the reinforcing tube 12 of the pipe 10.

The collar 21 is positioned in the pipe 10 with the end 24 thereof engaging the end 20 of the inner layer of concrete 14 of the pipe. When the collar 21 is thus positioned in the pipe a portion of the collar protrudes from the end of the pipe and a space is left between the collar band 22 and the reinforcing tube 12 in which caulking material 26, such as lead wool is driven. The collar 21 and the caulking material 26 are preferably assembled with the pipe at the place of manufacture.

When joining two lengths of the pipe 10 the end 17 of one pipe is positioned over the protruding portion of the collar 21 of the other pipe. In this position the end 25 of the collar 21 abuts the beveled face 17 of the second pipe and the flange 18 of the inner layer of concrete of the second pipe overhangs the end of the collar and a space is left between the outer surface of the collar and the inner surface of the reinforcing tube 12 of the second tube. When two lengths of pipe are thus joined a large chamber 27 is left between the end 16 of the first pipe and the end 15 of the second pipe. A caulking material 28 is then driven into the space between the collar and the reinforcing tube of the second pipe between the flange 18 and to approximately flush with the adjacent end of the second pipe. After the caulking material 28 is placed in position the chamber 27 is filled with a plastic material 29, such as asphaltum.

The thickness of the metal band 22 of the collar 21 is preferably less than the thickness of the reinforcing tube 12 so that when the pressure in a pipe line increases to an excessive degree the collars 21 will expand before the pipes whereupon the caulking materials 26 and 28 will be more tightly compressed thereby making the joints more leak-proof.

With this joint construction upon contraction or expansion of the pipes the reinforcing tubes of the pipes may slip on the outer surfaces of the caulking materials 26 and 28 and the caulking materials may slip on the outer surface of the collar band 22.

In Fig. 4 I have shown a slight modification wherein means is provided for locking the caulking materials in position. As shown in Fig. 4 the metal reinforcing tube 12 adjacent the pipe end 16 includes a corrugated portion as indicated at 30 and the metal band 22 of the collar 21 includes a corrugated portion 31 adjacent the end 25 thereof. By providing the corrugated portion 30 on the reinforcing tube 12 the caulking material 26 is locked thereto and moves therewith as the associated pipe expands or contracts and by providing the corrugated portion 31 on the collar band 22 the caulking material 28 is locked to the collar. It will be understood that if desired a corrugated portion may be provided adjacent each end of the reinforcing tube and that a corrugated portion may be provided adjacent each end of the collar band 22.

In Fig. 5 I have indicated a modified form of concrete pipe generally at 35. As shown the pipe 35 comprises a metal reinforcing tube 36 embedded between an outer layer of concrete 37 and an inner layer of concrete 38. The outer layer of concrete 37 at each end terminates flush with the adjacent end of the reinforcing tube 36 as indicated at 39 and 40 and the inner layer of concrete 38 at each end is set back from the adjacent end of the reinforcing tube as indicated at 41 and 42.

In forming a joint between two lengths of the pipe 35 I use a collar member indicated generally at 43. As shown the collar 43 comprises a metal band 44 having a ring of concrete 45 cast therein. The metal band 44 is corrugated throughout its length with a concave portion 46 intermediate its length having convex portions 47 and 48 one to each side thereof. The end of the band 44 adjacent the convex portion 47 terminates in a concave portion 49 and the end of the band adjacent the convex portion 48 terminates in a concave portion 50. The peaks of the convex portions of the collar band 44 are approximately the same diameter as the internal diameter of the reinforcing tube 36 of the pipe while the outer diameter of the bottoms of the concave portions are considerably less than the internal diameter of the reinforcing tube.

In use a ring of packing material 51, such as lead wool, is positioned in the concave portion 49 of the collar 43 between the end thereof and the peak of the convex portion 47. The collar 43 is then positioned in one section pipe 35 with the end thereof abutting the end 42 of the pipe. In this position a portion of the collar 43 protrudes beyond the adjacent end of the pipe and the peak 47 of the collar band engages the inner surface of the reinforcing tube 36 while the bottom of the concave portion 46 is spaced from the inner surface of the reinforcing tube.

The collar 43 is preferably assembled with the pipe at the place of manufacture and at the same time or later whichever is desired a caulking material 52, such as lead wool, is positioned in the concave portion 50 of the collar between the peak of the convex portion 48 and the adjacent end.

In joining the two lengths of pipe 35 the end 38 of one pipe is positioned over the protruding portion of the collar 43 of the other pipe with the end 41 of the second pipe abutting the face of the collar. In this position the concave portion 46 in combination with the adjacent ends of the reinforcing tubes 36 of the two pipe sections forms a chamber 53 with a smaller chamber 54 communicating therewith between the ends of the reinforcing tubes and the outer layers of concrete. After the pipes are thus joined a liquid caulking material 55 such as a molten lead is poured into the chamber 53 and thereafter the chamber 54 is filled with a plastic material 56, such as asphaltum.

The thickness of the metal band 44 of the collar 43 is preferably of less thickness than the thickness of the reinforcing tube 36 so that when the pressure in a pipe line increases to an excessive degree the collars 43 will expand before the pipes whereupon the caulking materials will be more tightly compressed thereby making the joints more leak-proof.

With this form of joint the pipes slip on the outer surfaces of the caulkings 51, 52 and 55, upon contraction or expansion of the pipes.

From the foregoing description it will be apparent that I have provided an improved concrete pipe and novel joint therefor which is leak-proof and which is economical to manufacture, simple in construction and highly efficient in use.

Having thus described my invention, I claim:

1. In combination with two lengths of pipe having a chamber at each end thereof, said pipe at one end having a flanged portion, a collar member, the external diameter of said collar being less than the inner diameter of said pipe chambers, said pipes being positioned end to end with the flanged portion of one adjacent the end of the other, said collar being positioned in said adjacent end chambers of said conduits with said flanged portion of one conduit protruding into the space between said collar and the inner surface of said chamber, and a caulking material positioned in the space between said collar and the inner surface of said chamber.

2. In combination with two lengths of concrete pipe positioned end to end, each of said pipes including a metal reinforcing tube embedded between an outer layer of concrete and an inner layer of concrete, said inner layer of concrete at each end being set back from the ends of pipe to form a chamber, a collar member, said collar member including a metal band having a concrete ring therein, the outer diameter of said collar being less than the inner diameter of said pipe reinforcing tube, said collar being positioned in the chambers at adjacent ends of said pipe lengths, the adjacent ends of said pipes from their associated reinforcing tubes outward being spaced to form a chamber between the ends of the pipes, a caulking material positioned in the space between the outer surface of said collar and the inner surface of said tube of one of said pipes, said caulking being positioned before said second pipe is joined to said collar, a second caulking material positioned in the space between the outer surface of said collar and the inner surface of said tube of said second pipe, said second caulking material being placed in position through said chamber between the ends of said pipes after said second pipe is joined to said collar, said first and second caulkings being spaced and a plastic filling material positioned in said space between said caulkings and in said chamber between the adjacent ends of said pipes.

3. In combination with two lengths of conduit having a chamber at each end thereof, said conduits at one end having a protruding flange, a collar member, the external diameter of said collar being less than the inner diameter of said conduit chambers, said conduits being positioned end to end with the flanged end of one adjacent the plane end of the other, said collar being positioned in said adjacent end chambers of said conduits with said flange of one conduit protruding into the space between said collar and the inner surface of said chamber, the adjacent ends of said conduits being spaced apart to form a passageway therebetween, a caulking material positioned in the space between said collar and the inner surface of said plane chamber, said caulking being placed in position before said second conduit is assembled with said collar, a second caulking material, said second caulking material being positioned between the outer surface of said collar and the inner surface of said flanged chamber of said second conduit after said second conduit is assembled with said collar, there being a space between said first and second caulking materials, said passageway between the adjacent ends of said conduits and the space between said caulking materials being filled with a plastic material, means on said conduits to lock one of said caulkings thereto and means on said collar to lock the other of said caulkings thereto.

4. In combination with two lengths of concrete pipe positioned end to end, each of said pipes including a metal reinforcing tube embedded between an outer layer of concrete and an inner layer of concrete, said inner layer of concrete at each end being set back from the ends of pipe to form a chamber, a collar member, said collar including a metal band having a concrete ring therein, the outer diameter of said collar being less than the inner diameter of said pipe reinforcing tube, said collar being positioned in the chambers at adjacent ends of said pipe lengths, the adjacent ends of said pipes from their associated reinforcing tubes outward being spaced to form a chamber between the ends of the pipes, a caulking material positioned in the space between the outer surface of said collar and the inner surface of said tube of one of said pipes, said caulking being positioned in place before said second pipe is joined to said collar, a second caulking material positioned in the space between the outer surface of said collar and the inner surface of said tube of said second pipe, said second caulking material being placed in position through said chamber between the ends of said pipes after said second pipe is joined to said collar, said first and second caulkings having a space therebetween, and a plastic filling material positioned in said space between said caulkings and in said chamber between the adjacent ends of said pipes, said reinforcing tubes including a corrugated portion engaging one of said caulkings and said collar band including a corrugated portion engaging the other of said caulkings.

5. In combination with two lengths of conduit having undercut portions at each end to provide a chamber at each end thereof, a collar member, the external diameter of said collar being less than the inner diameter of said conduit chambers, said lengths being positioned end to end with the collar ends engaging the adjacent ends of the undercut portions, said collar being positioned in said adjacent end chambers of said conduits, the adjacent outer end portions of said lengths being spaced apart to form a passageway therebetween, a caulking material positioned in the space between said collar and the inner surface of said collar chamber, said caulking being placed in position before said second length is assembled with said collar, a second caulking material, said second caulking material being positioned between the outer surface of said collar and the inner surface of said chamber of said second length after said second length is assembled with said collar, there being a space between said first and second caulking materials, said passageway between the adjacent outer ends of said lengths and the space between said caulking materials being filled with a plastic material.

BOZIDAR J. UKROPINA.